Figure 1:
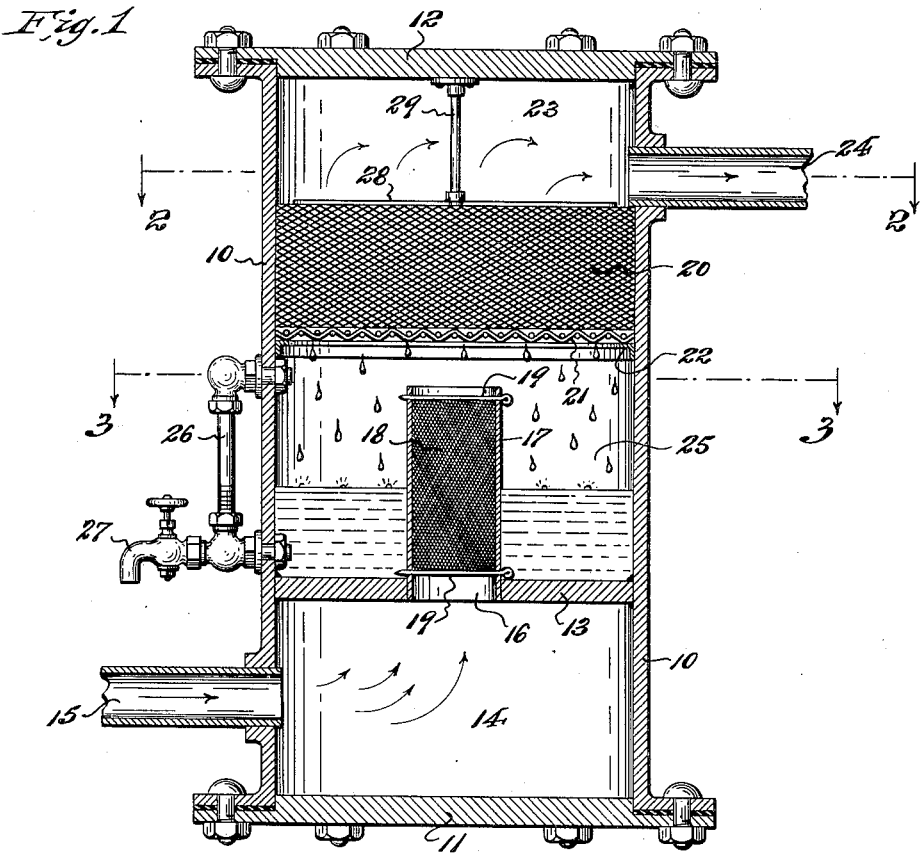

Sept. 12, 1950  A. M. GOODLOE  2,521,785
SEPARATOR FOR REMOVING ENTRAINED LIQUID PARTICLES
FROM A FLOWING GASEOUS MEDIUM
Filed April 9, 1948

INVENTOR.
Alfred M. Goodloe,
BY
George D. Richards
Attorney

Patented Sept. 12, 1950

2,521,785

UNITED STATES PATENT OFFICE 2,521,785

SEPARATOR FOR REMOVING ENTRAINED LIQUID PARTICLES FROM A FLOWING GASEOUS MEDIUM

Alfred Minor Goodloe, Upper Montclair, N. J., assignor to Metal Textile Corporation, West Orange, N. J., a corporation of Delaware Application April 9, 1948, Serial No. 19,958

4 Claims. (Cl. 183—70)

This invention relates to improvements in entrainment separators adapted to remove liquid particles which are entrained in a flowing gaseous medium; and the invention is especially adapted for use in a pressure line leading from a compressor, such e. g. as an air compressor, whereby to remove liquid particles, such e. g. as oil, moisture and the like, from the output of the compressor before said output is delivered to a place of use.

It has been observed that the output of a compressor, such e. g. as an air compressor, frequently carries, in entrainment therewith, very finely divided particles of oil which escape from the lubrication of the compressor, and sometimes particles of water which are derived from moisture laden air taken into the compressor. Such liquid particles are frequently so fine as to form a mist or fog which is very difficult to separate from the compressed air output of the compressor by reason of the resistance to coalescence which is offered by such finely divided particles.

I have discovered that minute mist or fog forming liquid particles can be caused to coalesce when the gaseous stream, in which they are entrained, is caused to traverse a very finely divided and densely packed mass of finely knitted metallic mesh or similar metallic strand material, provided the gaseous stream, in which the liquid particles are entrained, is caused to flow through said separator mass at sufficiently high velocity to cause the liquid particles to impinge, collect and coalesce upon the surfaces of the strands from which the separator mass is formed. This alone, however, does not solve the problem, because, owing to the high velocity of the gaseous stream, there is too much resistance to the gravitation of the drops of coalesced liquid particles from the separator mass, and therefore collection of the liquid in a sump below the separator mass is prevented. For this reason removal of the liquid from the gaseous stream is not accomplished, but on the contrary, the liquid drops are carried on with the gaseous stream merely in drops of larger size. Having ascertained this, I have further discovered that no attempt should be made to separate the enlarged liquid drops from the gaseous stream during the progress of said stream through the finely interstitial primary separator mass, but rather said enlarged liquid drops should be allowed to discharge with the gaseous stream from said primary separator mass, and thereafter caused to engage a secondary separator mass, of relatively coarse interstitial character, through which the gaseous stream flows at reduced velocity, so that, under such conditions, the liquid drops may be arrested, and the force of gravity may become effective upon the arrested drops so as to cause the same to drop out of the gaseous stream into a suitable collecting chamber or sump, and the gaseous stream, free from entrained liquid, can then be discharged from the secondary separator mass to a desired place of use. The secondary separator mass preferably comprises a comparatively loosely packed and coarsely interstitial mass of more openly knitted metallic mesh or similar strand material, the body of which is of substantially enlarged cross-sectional area as compared with the cross-sectional area of the primary separator mass.

Having the above in view, it is an object of this invention to provide a novel entrainment separator apparatus which functions by the above stated mode of operation, and which, to such end, comprises a casing containing a primary separator mass of fine interstitial character, a secondary separator mass of relatively coarse interstitial character and relatively enlarged cross-sectional area spaced above said primary separator mass, with a liquid collecting chamber or sump below said secondary separator mass from which collected liquid may be discharged, said casing having means for admitting a gaseous medium for movement through said successive separator masses, and means for discharging the gaseous medium issuing from the secondary separator mass.

Other objects of this invention, not at this time more particularly enumerated, will be understood from the following detailed description of the same.

Figure 2:
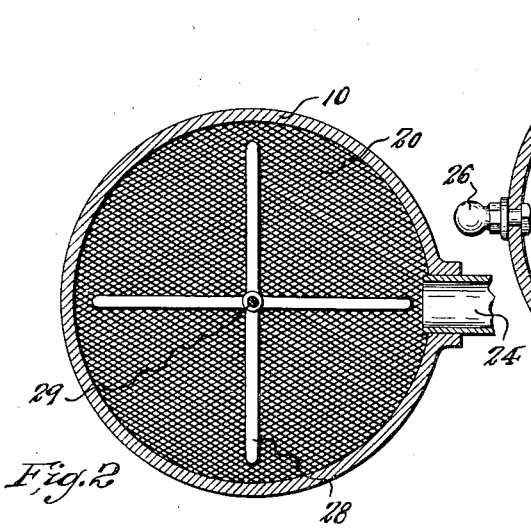
Figure 3:
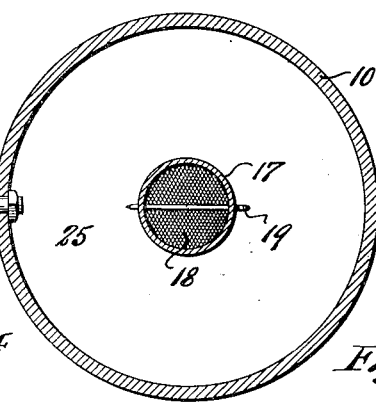

An illustrative embodiment of the invention is shown in the accompanying drawings, in which:

Fig. 1 is a longitudinal vertical sectional view through an entrainment separator apparatus made according to this invention; Fig. 2 is a fragmentary horizontal cross-sectional view, taken on line 2—2 in Fig. 1; and Fig. 3 is another fragmentary horizontal cross-sectional view, taken on line 3—3 in Fig. 1.

Similar characters of reference are employed in the herinabove described views, to indicate corresponding parts.

Referring to the drawings, the reference character 10 indicates the casing of the apparatus, which is closed at its bottom and top ends by the respective bottom wall 11 and top wall 12. Said casing may be of any desired cross-sectional shape, but is preferably cylindrical, of suitable length, and of diametric size to permit flow therethrough of the gaseous medium to be treated at a desired cubic feet per minute rate. Said casing will be constructed to accommodate and withstand the pressure of the gaseous medium which is to be caused to flow therethrough.

The interior of the casing is subdivided by a transverse partition wall 13 which is spaced upwardly from the bottom wall 11, thus providing a gaseous medium intake chamber 14 beneath said partition wall. Suitably connected with the casing 10, so as to enter the intake chamber 14, is a gaseous medium delivery conduit or pipe 15, which leads from a compressor (not shown) or other source of gaseous medium supply.

The partition wall 13 is provided with an opening or port 16, which is preferably centrally located therein. Connected with the partition wall 13, in register with said opening or port 16, and so as to extend upwardly from the latter within the interior of the casing, is an upstanding endwise open housing member 17. This housing member 17 is of substantially reduced cross-sectional area as compared with the cross-sectional area of the interior of the casing 10. The length and height of the housing member 17 may be suitably predetermined according to the desired size of primary separator mass which is to be packed therein.

The interior of the housing member 17 is filled with a primary separator mass 18. This primary separator mass comprises an agglomeration of comparatively fine metallic strands which are densely compacted to provide a body of fine interstitial structure. Preferably said primary separator mass 18 is composed of a rather tightly knit mesh knitted from metallic wire in the range of .003 diameter or less. It will be understood, however, that the size of the wire, denseness of the pack and diameter and length sizes of the body formed therefrom can be varied to best accommodate the nature of the mist or fog forming liquid particles entrained in the gaseous medium to be treated, and for accommodation to the velocity at which the gaseous medium is desired to be moved through the body. A primary separator mass of the kind above mentioned has been found to be very efficient for coalescing fog or mist forming liquid particles of oil or water entrained in compressed air moving therethrough at a velocity of from two to three thousand lineal feet per minute. The primary separator mass 18 can be secured within and against displacement from the housing member 17 in any suitable manner. One illustrative means for retaining the primary separator mass in place within the housing member, as shown, comprises transverse retainer pins 19 which are engaged through the walls of the housing member respectively across the bottom and top ends of said primary separator mass 18.

Spaced above the discharge end of the housing member 17 and its contained primary separator mass 18 is an enlarged secondary separator mass 20, of suitable length or height, which fills the entire cross-sectional area of the interior of the casing 10. This secondary separator mass 20 comprises an agglomeration of comparatively coarse metallic strands which are substantially less densely compacted to provide a body of comparatively coarse or more open interstitial structure. Preferably said secondary separator mass 20 is composed of a comparatively loosely knit mesh knitted from metallic wire. Means is provided for supporting the secondary separator mass 20 across the interior of the casing 10; which means may comprise a suitable grating, such e. g. as one composed of woven wire mesh as shown at 21. Said grating is supported by a carrying flange 22 which is affixed to and projects from the walls of the casing 10.

The secondary separator mass 20 is spaced downwardly from the top wall 12 of the casing 10, thus providing, within the upper end of the latter, a gaseous medium outlet chamber 23. Suitably connected with the casing 10, so as to lead out of the outlet chamber 23, is a gaseous medium discharge conduit or pipe 24, through which the gaseous medium, substantially free from entrained liquid, may be delivered to a desired place of use.

Suitable means is provided for holding the secondary separator mass 20 against upward displacement from its operative position within the interior of the casing 10. An illustrative means for this purpose, as shown, comprises a keeper spider 28 having a plurality of radial arms to bear against the upper end of the secondary separator mass 20. Said keeper spider 28 is supported by a suspension rod 29 which is suitably connected with the casing top wall 12 so as to depend therefrom.

The space within the interior of the casing 10, intermediate the partition wall 13 and the secondary separator mass 20, and around the upstanding housing member 17 which contains the primary separator mass 18, provides an annular well or sump 25 into which liquid, coalesced into drops by the separator masses, may fall by gravity and accumulate. Mounted on the exterior of the casing 10, so as to communicate with the interior of the well or sump 25, is a liquid level gauge 26, which is operative to indicate the depth of liquid which has accumulated in said well or sump. Coupled in connection with the lower end of said gauge 26 is a faucet or tap 27 through which the accumulated liquid may be drawn off from said well or sump when necessary.

When the entrainment separator apparatus is connected in a line through which a gaseous medium to be treated flows, as e. g. in the discharge line of an air compressor, the compressed air enters the intake chamber 14 through the conduit or pipe 15. From the intake chamber 14, the air is compelled to pass upwardly through the housing member 17 and the primary separator mass 18 contained therein. Owing to the comparatively small cross-sectional area of the housing member 17, the air is caused to traverse the primary separator mass 18 at high velocity. Since the primary separator mass 18 is of relatively fine interstitial structure, minute fog or mist forming liquid particles entrained in the air are caused to impinge on the filaments or strands of the primary separator mass, and are thus brought into intimate contact sufficient to cause said particles to coalesce, and thereby to form comparatively large drops. The drops thus formed will, by reason of the high velocity of air flow, be dislodged from the filaments or strands of the primary separator mass 18, so as to be carried on with the air stream out of said primary separator mass.

After the air, with the accompanying enlarged drops of liquid, discharges from the primary separator mass 18 into the relatively large space provided by the whole cross-sectional area of the casing 10, to flow thence upwardly through the correspondingly enlarged secondary separator mass 20, as the air enters the latter, which is of enlarged interstitial structure, the entrained drops of liquid will impinge upon the filaments or strands of the secondary separator mass, so as to be arrested thereby, and so that some further coalescence and enlargement of the liquid drops occurs. Owing to the enlarged cross-sectional area of the casing 10 and the contained secondary separator mass 20 relative to that of the housing member 17 and contained primary separator mass 18, the velocity of air flow drops considerably, as the air enters and traverses said secondary separator mass. As a result of this, the resistance to gravitation of the formed liquid drops is so reduced that said drops are subject to the influence of gravity, and consequently fall downwardly out of the secondary separator mass into the well or sump 25, so as to be collected in the latter. In this manner, the liquid entrained in the air is efficiently separated therefrom so that, by the time the air emerges from the secondary separator mass, said air is substantially free from entrained liquid. The air thus freed from entrained liquid is thereupon discharged from the outlet chamber 23 through the pipe or conduit 24 to a desired place of use.

Having now described by invention, I claim:

1. Apparatus for separating entrained liquid from a flowing gaseous medium comprising a casing closed at its ends, means to deliver a gaseous medium to be treated into the lower interior of said casing, means to discharge treated gaseous medium from the upper interior of said casing, means intermediate the lower and upper interior portions of said casing adapted to provide a passage of substantially reduced diameter, an interstitial primary separator mass filling said passage, said passage being adapted to accelerate flow of gaseous medium through said primary separator mass at a high velocity and thereby form large drops of entrained liquid and project them upward, an interstitial secondary separator mass of cross-sectional area substantially corresponding to that of the casing, said secondary separator mass being fixed above the discharge end of said passage and its contained primary separator mass and being adapted to decelerate flow of the gaseous medium to a reduced velocity and cause coalescence of the liquid drops that are projected into the same, and means beneath said secondary separator mass adapted to provide a liquid collecting sump.

2. Apparatus for separating entrained liquid from a flowing gaseous medium as defined in claim 1, wherein the primary separator mass comprises an agglomeration of metallic filaments densely packed to form a body of fine interstitial structure, and wherein the secondary separator mass comprises an agglomeration of metallic filaments less densely packed to form a body of relatively coarse interstitial structure.

3. Apparatus for separating entrained liquid from a flowing gaseous medium comprising a casing closed at its bottom and top ends, a transverse partition spaced above the bottom end of said casing and having an opening therein, an endwise open, upstanding housing member of reduced cross sectional area supported by said partition in registration with the opening therein, an interstitial primary separator mass mounted within said housing member and being adapted to form large drops of entrained liquid and project them upward, an interstitial secondary separator mass of relatively large cross-sectional area supported within said casing above said partition and the top discharge end of said housing member and adapted to cause coalescence of the liquid drops that are projected into the same, the annular space around said housing member intermediate said partition and said secondary separator mass being adapted to provide a liquid collecting sump, means for introducing a gaseous medium to be treated into the casing below said partition for upward flow through said housing member and contained primary separator mass, and means above said secondary separator mass for discharging treated gaseous medium from the upper interior of said casing.

4. Apparatus for separating entrained liquid from a flowing gaseous medium as defined in claim 3, wherein the primary separator mass comprises an agglomeration of metallic filaments densely packed to form a body of fine interstitial structure, and wherein the secondary separator mass comprises an agglomeration of metallic filaments less densely packed to form a body of relatively coarse interstitial structure.

ALFRED MINOR GOODLOE.

REFERENCES CITED

The following references are of record in the file of this patent:

UNITED STATES PATENTS

| Number | Name | Date |
|---|---|---|
| 1,458,005 | Rohrer | June 5, 1923 |
| 1,739,093 | Ruby | Dec. 10, 1929 |